No. 816,610. PATENTED APR. 3, 1906.
R. SIEGFRIED.
FLEXIBLE CONNECTION FOR GEARLESS MOTORS.
APPLICATION FILED MAY 22, 1905.

2 SHEETS—SHEET 2.

WITNESSES:
C. L. Belcher
Otto S. Schairer

INVENTOR
Robert Siegfried
BY
Wesley G. Carr
ATTORNEY

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

FLEXIBLE CONNECTION FOR GEARLESS MOTORS.

No. 816,610.   Specification of Letters Patent.   Patented April 3, 1906.

Application filed May 22, 1905. Serial No. 261,672.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Flexible Connections for Gearless Motors, of which the following is a specification.

My invention relates to electrically-propelled vehicles, and particularly to means for operatively connecting the armatures of gearless motors to the wheels of such vehicles.

The object of my invention is to provide simple, easily-applied, and durable connections between a motor-armature and a truck-wheel which shall constitute spring-supports for the armature in all of its positions and shall also afford slightly-yielding connections for transmitting the motor torque to the truck-wheels.

Figure 1:
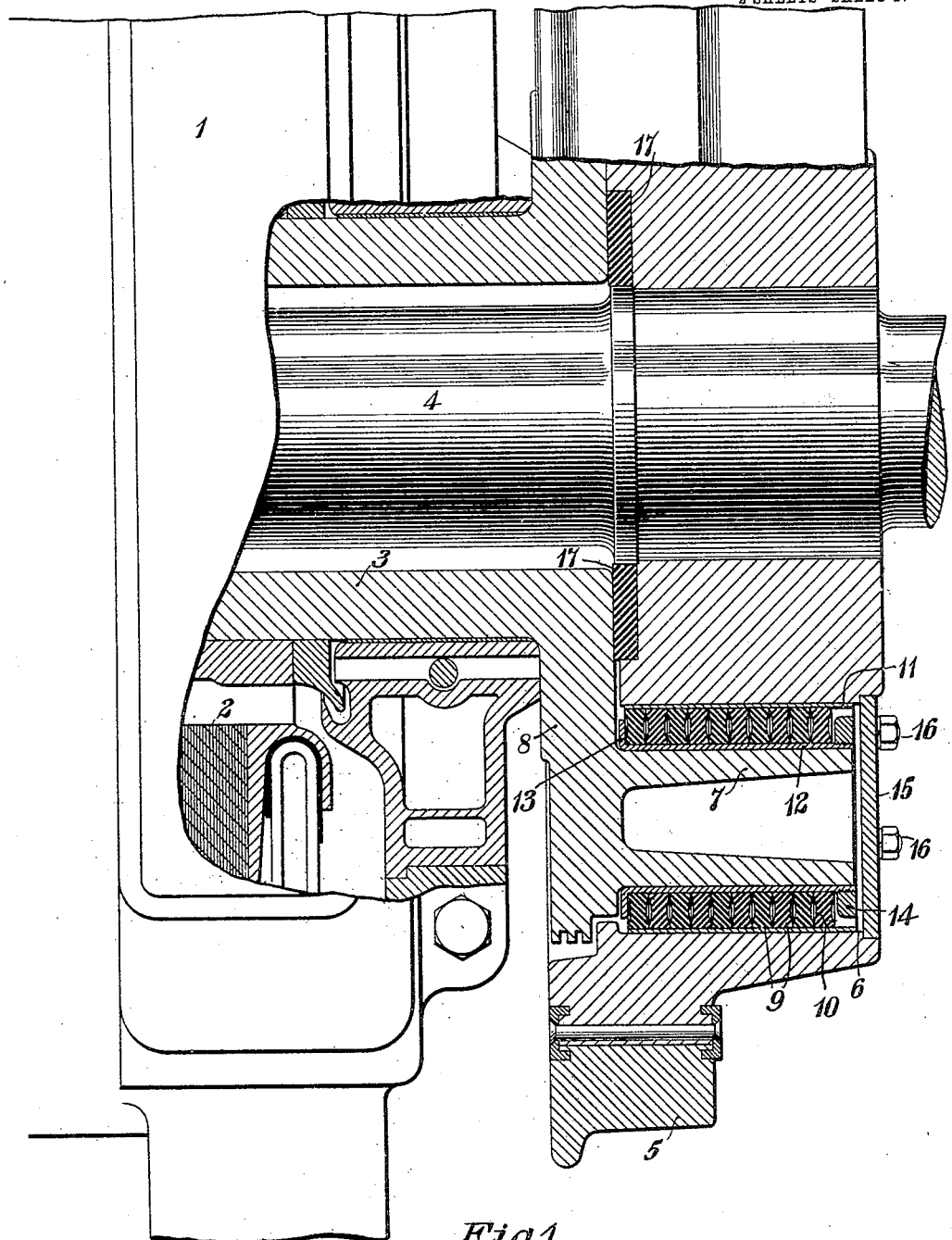
Figure 2:
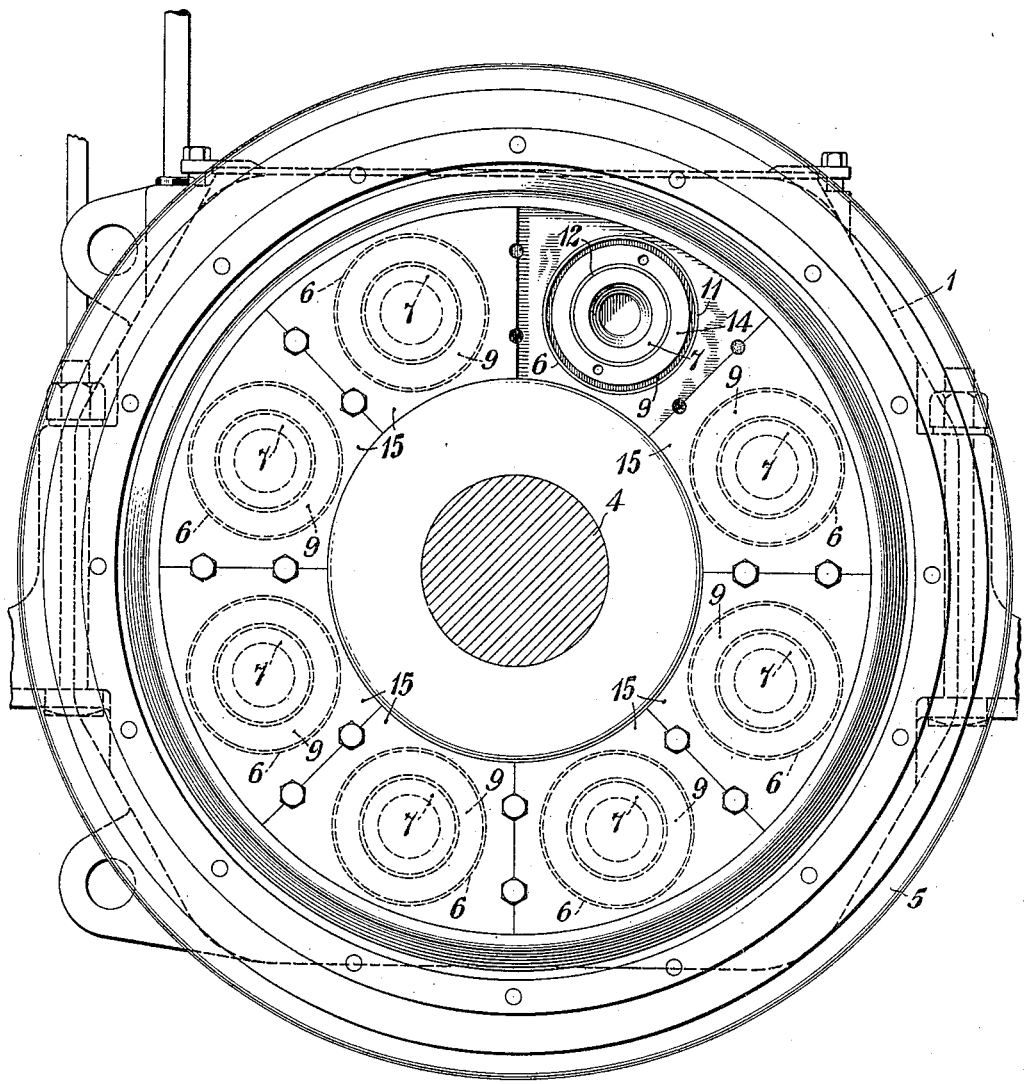

In the accompanying drawings, Figure 1 is a plan view, partially in section, of a portion of a truck-axle and the attached wheel and driving-motor. Fig. 2 is an end elevation of a truck-wheel and motor embodying my invention, the axle being in section and one of the wheel-plates being omitted.

While it is the general practice to connect a motor-armature to the axle of a truck to be driven thereby by means of speed-reducing gearing, various expedients have been devised and tried for utilizing slow-speed motors for driving vehicles without the use of speed-reducing gearing. Such expedients have not generally been successful on account of failure to provide or employ satisfactory means for so supporting the motor-armatures as to protect them from the shocks which have been caused by wheel or rail irregularities, or by both. The means which I have shown in the accompanying drawings and which I will now describe provides a uniformly-distributed cushion for supporting the armature in all of its positions and one which is simple in construction, easily manufactured and applied, and durable in use.

Referring now particularly to the drawings, the field-magnet frame 1 of the motor may be supported upon the truck-frame (not shown) by any suitable means and its armature 2 may be mounted upon a sleeve or quill 3, which surrounds the truck-axle 4, but has an internal diameter that is greater than the external diameter of the axle, so as to permit of independent lateral motion. The truck-wheel 5 is provided with one or more cylindrical openings 6, eight of such openings being shown in the drawings, though any other suitable number may be employed. The openings 6 are preferably distributed uniformly around the wheel and into each of them projects a cylindrical boss 7, which may constitute a part of an end flange 8 or a radial arm with which the sleeve or quill 3 is provided. The external diameter of each of the bosses 7 is less than the internal diameter of the recess 6 into which it projects by a sufficient amount to receive a cushioning device and retaining means therefor. Each of the cushioning devices in the present instance comprises a plurality of soft-rubber rings 9, the lateral faces of which are normally concave, as indicated at 10, so that when pressure is exerted upon the rings they may expand laterally, and thus yield sufficiently to perform their functions. Each recess 6 is preferably provided with a suitable lining-cylinder 11, and the rubber rings are retained in position within this lining-cylinder by an interior cylinder 12, having an annular flange 13 at its inner end and a removable metal ring or nut 14 at its outer end.

The outer end of each of the recesses 6 may be closed by means of a plate 15, which may be fastened in position by means of suitable screws or bolts 16. Access to each of the recesses 10 may thus be had without difficulty in order to make repairs or to replace damaged or worn-out cushioning-rings by removing the bolts 16 and the plate 15 and unscrewing the retaining-ring 14.

Between the end of the sleeve or quill 3 and the wheel 5 I locate a ring 17 of suitable yielding resilient material, such as soft rubber, to receive the endwise thrust of the quill and armature.

Details of construction which differ from what I have shown, but which do not materially change the mode of operation or result, are within the scope of my invention.

I claim as my invention—

1. The combination with a truck-wheel having a cylindrical chamber or opening and a set of yielding, resilient rings arranged side by side in said opening, of an electric motor, a sleeve or quill for the motor-armature having a boss that projects through the set of rings in said wheel-chamber.

2. The combination with a truck-wheel having a cylindrical chamber, of a motor-armature, a sleeve therefor having a boss that projects into said wheel-chamber and a set of side-by-side rubber rings interposed between said boss and the wall of the chamber.

3. The combination with a truck-wheel having a cylindrical chamber the axis of which is substantially parallel to the wheel-axis, of a sleeve or quill having a boss that projects into said wheel-chamber and a set of soft-rubber rings having concave side faces and interposed between the boss and the wall of its chamber.

4. The combination with a truck-axle and a wheel having a chamber the axis of which is substantially parallel to the wheel-axis, of a sleeve or quill surrounding the axle and having a boss that projects from one end thereof into said wheel-chamber, and a set of compressible, resilient rings interposed in said chamber between its wall and the corresponding boss.

5. The combination with a truck-axle and a wheel therefor, having a cylindrical chamber, the axis of which is substantially parallel to the wheel-axis, of a sleeve or quill surrounding the axle, and of greater internal diameter than the axle, and having a boss that projects into said wheel-chamber, and a set of compressible, resilient rings in said chamber through which the corresponding boss projects.

6. The combination with a truck-axle and a wheel therefor, having a set of cylindrical chambers, the axes of which are substantially parallel to the wheel-axis, of a sleeve or quill loosely surrounding the axle and having bosses that project into said wheel-chambers, and a set of soft-rubber rings interposed between each boss and the surrounding wall of its chamber.

7. The combination with a truck-axle and a wheel therefor, having a set of cylindrical chambers, the axes of which are substantially parallel to the wheel-axis, of a motor-armature, a sleeve or quill therefor, surrounding the axle but adapted to have lateral movement with reference thereto and having bosses that project into the wheel-chambers, and a set of soft-rubber rings and having concave side faces and interposed between each boss and the surrounding wall of its chamber.

8. The combination with a truck-wheel having an annular set of cylindrical chambers or openings and a set of yielding, resilient rings arranged side by side in each of said openings, of an electric motor, a sleeve or quill for the motor-armature having bosses that severally project through the sets of rings in said wheel-chambers.

9. The combination with a truck-wheel having an annular set of cylindrical chambers, of a motor-armature, a sleeve therefor having bosses that project into said wheel-chambers and a set of side-by-side rubber rings interposed between each boss and the wall of the corresponding chamber.

10. The combination with a truck-wheel having a set of cylindrical chambers the axes of which are substantially parallel to the wheel-axis, of a sleeve or quill having bosses that project into said wheel-chambers and a set of soft-rubber rings having concave side faces and interposed between each boss and the wall of its chamber.

11. The combination with a truck-axle and a wheel having a set of chambers the axes of which are substantially parallel to the wheel-axis, of a sleeve or quill surrounding the axle and having bosses that project from one end thereof into said wheel-chambers, and a set of compressible, resilient rings interposed in each of said chambers between its wall and the corresponding boss.

12. The combination with a truck-axle and a wheel therefor, having a set of cylindrical chambers, the axes of which are substantially parallel to the wheel-axis, of a sleeve or quill surrounding the axle, and of greater internal diameter than the axle, and having bosses that project into said wheel-chambers, and a set of compressible, resilient rings in each of said chambers through which the corresponding boss projects.

13. The combination with a rotatable member having a chamber or opening and a set of yielding, resilient rings arranged side by side in said opening, of an electric motor, a sleeve or quill for the motor-armature having a boss that projects through the set of rings in said chamber.

14. The combination with a rotatable member having a chamber, of a motor-armature, a sleeve therefor having a boss that projects into said chamber and a set of side-by-side rubber rings interposed between said boss and the wall of the chamber.

15. The combination with a rotatable member having a chamber the axis of which is substantially parallel to the axis of the member, of a sleeve or quill having a boss that projects into said chamber and a set of soft-rubber rings having concave side faces and interposed between the boss and the wall of its chamber.

16. The combination with a shaft or axle and a wheel having a chamber the axis of which is substantially parallel to the wheel-axis, of a sleeve or quill surrounding the shaft or axle and having a boss that projects from one end thereof into said wheel-chamber, and a set of compressible, resilient rings interposed in said chamber between its wall and the corresponding boss.

17. The combination with a shaft or axle and a wheel therefor, having a chamber, the axis of which is substantially parallel to the wheel-axis, of a sleeve or quill surrounding the shaft or axle and having a boss that projects into said wheel-chamber, and a set of compressible, resilient rings in said chamber through which the corresponding boss projects.

18. The combination with a truck-axle and a wheel therefor, having a set of chambers, the axes of which are substantially parallel to the wheel-axis, of a sleeve or quill loosely surrounding the axle and having bosses that project into said wheel-chambers, and a set of soft-rubber rings interposed between each boss and the surrounding wall of its chamber.

19. The combination with a truck-axle and a wheel therefor, having a set of chambers, the axes of which are substantially parallel to the wheel-axis, of a motor-armature, a sleeve or quill therefor, surrounding the axle but adapted to have lateral movement with reference thereto and having bosses that project into the wheel-chambers, and a set of soft-rubber rings and having concave side faces and interposed between each boss and the surrounding wall of its chamber.

20. The combination with a rotatable member having a chamber or opening and a set of yielding, resilient rings arranged side by side in said chamber or opening, of an electric motor, a sleeve or quill for the motor-armature having a boss that projects through the set of rings in said chamber or opening.

21. The combination with a rotatable member having an annularly-disposed set of chambers, of a motor-armature, a sleeve therefor having bosses that project into said chambers and a set of side-by-side rubber rings interposed between each boss and the wall of the corresponding chamber.

22. The combination with a rotatable member having a chamber the axis of which is substantially parallel to the wheel-axis, of a sleeve or quill having a boss that projects into said wheel-chamber and a set of soft-rubber rings having concave side faces and interposed between the boss and the wall of its chamber.

23. The combination with a shaft or axle and a wheel having a set of chambers the axes of which are substantially parallel to the wheel-axis, of a sleeve or quill surrounding the shaft or axle and having bosses that project from one end thereof into said wheel-chambers, and a set of compressible, resilient rings interposed in each of said chambers between its wall and the surrounding boss.

24. The combination with a shaft or axle and a wheel therefor, having a set of cylindrical chambers, the axes of which are substantially parallel to the wheel-axis, of a sleeve or quill surrounding the shaft or axle, and of greater internal diameter than the shaft or axle, and having bosses that project into said wheel-chambers, and a set of compressible, resilient rings in each of said chambers through which the corresponding boss projects.

25. The combination with a rotatable member having one or more chambers, and a set of side-by-side resilient rings in each chamber, of an operating member provided with one or more bosses that project through the set or sets of rings in said chamber or chambers.

26. The combination with a rotatable member having a plurality of cylindrical chambers and a set of side-by-side resilient rings in each of said chambers, of an operating member having bosses that severally project through the sets of rings in said chambers.

In testimony whereof I have hereunto subscribed my name this 20th day of May, 1905.

ROBERT SIEGFRIED.

Witnesses:
B. M. WILLIAMS,
BIRNEY HINES.